United States Patent
Manigandan

(10) Patent No.: US 8,694,661 B2
(45) Date of Patent: Apr. 8, 2014

(54) METHOD OF COMMUNICATION TO A DETACHED TERMINAL VIA A NETWORK

(75) Inventor: Balaji Manigandan, Bangalore (IN)

(73) Assignee: ST-Ericsson SA, Plan-les-Ouates (CH)

( * ) Notice: Subject to any disclaimer, the term of this patent is extended or adjusted under 35 U.S.C. 154(b) by 754 days.

(21) Appl. No.: 12/158,312

(22) PCT Filed: Dec. 13, 2006

(86) PCT No.: PCT/IB2006/054812
§ 371 (c)(1),
(2), (4) Date: Oct. 24, 2008

(87) PCT Pub. No.: WO2007/072329
PCT Pub. Date: Jun. 28, 2007

(65) Prior Publication Data
US 2009/0204717 A1 Aug. 13, 2009

(30) Foreign Application Priority Data
Dec. 19, 2005 (EP) .................................... 05301079

(51) Int. Cl.
*G06F 15/16* (2006.01)

(52) U.S. Cl.
USPC ............ 709/230; 709/206; 709/227; 709/237

(58) Field of Classification Search
USPC ................. 709/203, 206, 207, 227, 230, 237;
370/311, 312; 379/88.13, 88.15, 88.17,
379/88.22, 142.1, 162–164,
379/207.05–207.08; 455/466
See application file for complete search history.

(56) References Cited

U.S. PATENT DOCUMENTS

| | | | | |
|---|---|---|---|---|
| 6,829,633 B2* | 12/2004 | Gelfer et al. | ................... | 709/203 |
| 7,043,264 B2* | 5/2006 | Vance et al. | ................... | 455/466 |
| 7,043,530 B2* | 5/2006 | Isaacs et al. | ................... | 709/206 |
| 7,142,895 B2* | 11/2006 | Heatley | .......................... | 455/574 |
| 7,209,955 B1* | 4/2007 | Major et al. | ................... | 709/207 |
| 7,254,221 B2* | 8/2007 | Koch | .......................... | 379/88.21 |
| 7,439,872 B2* | 10/2008 | Hiltunen | .................... | 340/691.1 |
| 7,443,964 B2* | 10/2008 | Urban et al. | ................ | 379/88.23 |
| 7,505,571 B2* | 3/2009 | Bhatia et al. | ................ | 379/88.22 |
| 7,505,759 B1* | 3/2009 | Rahman | ..................... | 455/412.2 |
| 7,526,525 B2* | 4/2009 | Hagale et al. | ................. | 709/204 |

(Continued)

FOREIGN PATENT DOCUMENTS

| | | | |
|---|---|---|---|
| EP | 0763958 A2 | 3/1997 |
| EP | 0783219 A2 | 7/1997 |

(Continued)

*Primary Examiner* — Melvin H Pollack
(74) *Attorney, Agent, or Firm* — Potomac Patent Group PLLC

(57) ABSTRACT

A communication apparatus, which allows a user to communicate via a network, carries out a switch off step (SOA) in response to a switch off command. In the switch off step (SOA), the communication apparatus allows the user to select (SM2, SM3) a detach message from a list of detach messages (DML). The communication apparatus conveys (SM6, SM7) a detach message identification (MID) to the network and, subsequently, switches off (SM8). The detach message identification (MID) represents the detach message that the user has selected. The network carries out a call handling step in which the network conveys the detach message to another communication apparatus from which a call emanates that is destined for the communication apparatus that is switched off.

18 Claims, 4 Drawing Sheets

(56) References Cited

U.S. PATENT DOCUMENTS

| | | | |
|---|---|---|---|
| 7,551,568 B2* | 6/2009 | Jeong et al. | 370/252 |
| 7,584,257 B2* | 9/2009 | Isaacs et al. | 709/206 |
| 7,590,226 B2* | 9/2009 | Dillard et al. | 379/88.17 |
| 7,623,892 B2* | 11/2009 | Hawkins | 455/556.1 |
| 7,634,256 B2* | 12/2009 | Sherman et al. | 455/415 |
| 7,650,170 B2* | 1/2010 | May et al. | 455/569.2 |
| 2004/0176076 A1 | 9/2004 | Uppuluri | |
| 2005/0266830 A1* | 12/2005 | Barclay et al. | 455/412.1 |
| 2007/0047711 A1* | 3/2007 | Florkey et al. | 379/162 |
| 2007/0184857 A1* | 8/2007 | Pollock et al. | 455/466 |
| 2009/0215504 A1* | 8/2009 | Lando | 455/574 |

FOREIGN PATENT DOCUMENTS

| | | |
|---|---|---|
| EP | 1484937 A2 | 12/2004 |
| JP | 05-136885 A | 6/1993 |
| JP | 11-164340 A | 6/1999 |
| JP | 11-196468 A | 7/1999 |
| JP | 2002-064864 A | 2/2002 |
| JP | 2003-283749 A | 10/2003 |
| JP | 2005-117278 A | 4/2005 |
| WO | 02054739 A2 | 7/2002 |
| WO | 03063465 A2 | 7/2003 |

* cited by examiner

| MID | MSG | |
|---|---|---|
| 0 | -- | |
| 1 | AA | |
| 2 | BB | |
| 3 | CC | |
| 4 | DD | |
| 5 | EE | |
| 6 | FF | |
| 7 | GG | |
| 8 | HH | * |
| 9 | II | * |
| 10 | JJ | * |
| 11 | KK | * |
| 12 | LL | * |
| 13 | MM | * |
| 14 | NN | * |
| 15 | OO | * |

DML

DRQ

METHOD OF COMMUNICATION TO A DETACHED TERMINAL VIA A NETWORK

FIELD OF THE INVENTION

An aspect of the invention relates to a method of communicating via a network, such as, for example a GSM cellular phone network (GSM is an acronym for Global System for Mobile communication). Other aspects of the invention relate to a communication apparatus that can be switched off, a communication network, a signal for a communication network, a computer program product for a communication apparatus, and a computer program product for a communication network.

DESCRIPTION OF PRIOR ART

United States patent application published under number US2004/0176076 describes that a mobile subscriber provides his personal status to his wireless network by selecting one of several possible predetermined statuses. A subsequent caller to the mobile subscriber's mobile station is terminated in the network with a message appropriate to the personal status mobile subscriber if the personal status of the mobile subscriber is anything but available. The ability to convey one's personal status to the network to avoid incoming calls can be advantageous to a mobile subscriber in many situations in which the subscriber does not merely want to turn of his mobile station to avoid answering a call.

SUMMARY OF THE INVENTION

According to an aspect of the invention, a communication apparatus, which allows a user to communicate via a network, carries out a switch off step in response to a switch off command. In the switch off step, the communication apparatus allows the user to select a detach message from a list of detach messages. The communication apparatus conveys a detach message identification to the network and, subsequently, switches off. The detach message identification represents the detach message that the user has selected The network carries out a call handling step in which the network conveys the detach message to another communication apparatus from which a call emanates that is destined for the communication apparatus that is switched off.

The invention takes the following aspects into consideration. A user of a communication apparatus may convey his or her personal status to a network in accordance with the aforementioned prior art while leaving his or her communication apparatus in an active state. For example, the user may send specific personal status data to the network before he or she enters a meeting so as to prevent having to answer an incoming call during the meeting. The user may leave his or her communication apparatus switched on. The user should modify his or her personal status once the meeting has ended, if the user desires to receive incoming calls. That is, the user should send new specific personal status data to the network indicating his or her availability. Otherwise, he or she will remain unavailable to answer an incoming call.

It may happen that the user has forgotten that he or she had previously sent specific personal status data to the network, which indicates unavailability to answer an incoming call. It may thus happen that the user thinks that he or she can be reached via the communication apparatus, whereas in reality the network prevents an incoming call from reaching the communication apparatus. Forgetfulness may also lead to a situation where the network maintains a personal status for the user that does not correspond with his or her actual personal status. For example, the user may have sent specific personal status data to the network so as to define a personal status "I am in meeting" whereas the user has already left the meeting and is currently driving on his way home. Any such situation continues until the user is aware that the network maintains a personal status for him or her that does not correspond with a desired personal status.

In accordance with the aforementioned aspect of the invention, in a switch off step, a communication apparatus allows a user to select a detach message from a list of detach messages. The communication apparatus conveys a detach message identification to the network and, subsequently, switches off. The detach message identification represents the detach message that the user has selected. The network carries out a call handling step in which the network conveys the detach message to another communication apparatus from which a call emanates that is destined for the communication apparatus that is switched off.

In accordance with the invention, the user may switch off his or her communication apparatus so as to prevent receiving an incoming call, which is a natural act. The communication apparatus may prompt the user to select a message, which specifies a particular reason for his or her unavailability, before actually switching off. A calling party, who seeks to reach the user, will receive this message as long as the communication apparatus is switched off. The user will automatically be available again for answering an incoming call when the user switches on the communication apparatus.

In summary, the user is available when the communication apparatus is switched on, whereas he or she is unavailable when the communication apparatus is switched off. The communication apparatus in accordance with the invention allows the user to specify a particular unavailability message when switching off. Consequently, there is less risk that forgetfulness leads to an undesired unavailability and that forgetfulness leads to an erroneous messaging with respect to unavailability. For those reasons, the invention allows better communication and, moreover, more user-friendliness.

Another advantage of the invention relates to the following aspects. A communication system may provide for a detach request message, which signals a network that a communication apparatus is about to be switched off and will therefore not be able to answer any incoming call. GSM is an example of a communication system that provides for such a detach request message. The detach message identification, which has been established in accordance with the invention, can be included in the detach request message. Consequently, the invention does not necessarily require modification of an existing standard or additional protocols and signals within an existing standard. As a result, the invention allows low-cost implementations.

Yet another advantage of the invention relates to the following aspects. As mentioned hereinbefore, the user switches off his or her communication apparatus when the user does not wish to receive any incoming calls. Nonetheless, the user can communicate with a calling party, while the communication apparatus is switched off, by means of the detach message that the user has selected when switching off the communication apparatus. That is, the user can establish a one-way communication, albeit of a relatively simple nature, without the communication apparatus consuming any power while this one-way communication takes place. Consequently, the invention allows power efficiency.

These and other aspects of the invention will be described in greater detail hereinafter with reference to drawings.

DETAILED DESCRIPTION

Figure 1:
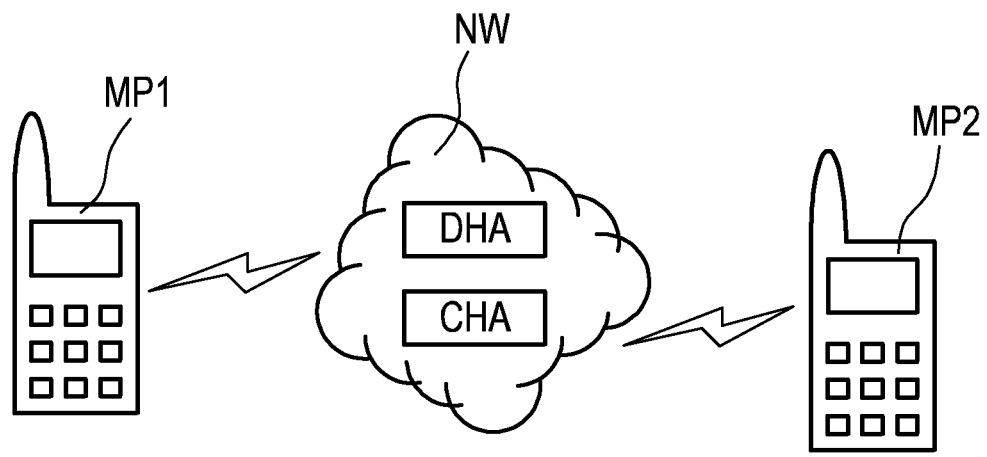
FIG. 1 is a conceptual diagram that illustrates a communication system for cellular phones.

FIG. 1 illustrates a communication system that comprises two cellular phones MP1, MP2 and a network NW via which the two cellular phones MP1, MP2 may communicate with each other. It will be assumed hereinafter that the communication system operates in accordance with the GSM standard (GSM is an acronym for Global System for Mobile communication). In accordance with the GSM standard, the network NW comprises various entities, such as, for example, a base transceiver station (BTS), a base switching center (BSC), a mobile switching center (MSC), a home location register (HLR), and a visitor location register (VLR). Each of these entities generally comprises a suitably programmed data processing arrangement for carrying out various network-related functions.

The network NW comprises two application programs in accordance with the invention: a detach handling application program DHA, and a call handling application program CHA. Each of these application programs comprises a set of instructions that causes the network NW to carry out various operations in accordance with the invention. An application program may comprise various modules, a module comprising a subset of instructions. Different modules may be stored in respective program memories of different entities within the network NW. That is, an application program may be distributed, as it were, over various entities within the network NW. The detach handling application program DHA and the call handling application program CHA will be described in greater detail hereinafter.

Figure 2:
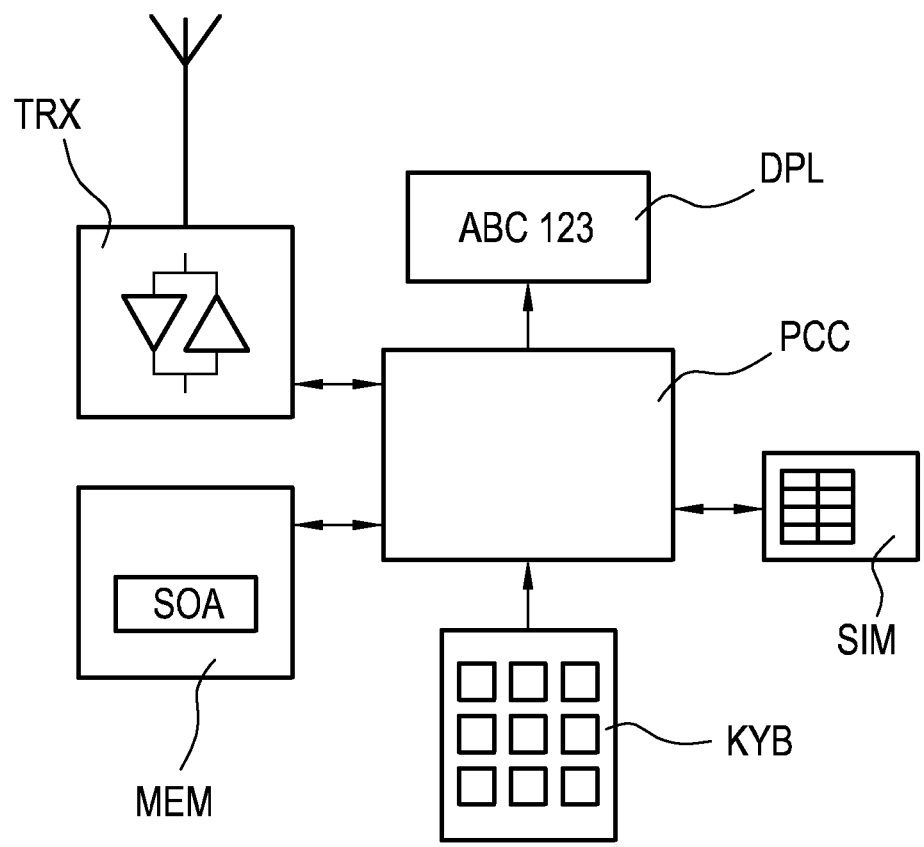
FIG. 2 is a block diagram that illustrates a cellular phone in the communication system.

FIG. 2 illustrates cellular phone MP1. Cellular phone MP1 comprises a transceiver circuit TRX, a processing and control circuit PCC, a memory MEM, and a subscriber identity module SIM. The cellular phone MP1 further comprises a display device DPL and a keyboard KYB, which are human interface devices. The processing and control circuit PCC can receive data from the network NW and can send data to the network NW via the transceiver circuit TRX. The processing and control circuit PCC can receive user data via the keyboard KYB and can display data via the display device DPL. The processing and control circuit PCC can further cooperate with the subscriber identity module SIM, which comprises subscriber identity information and other user-specific data. The processing and control circuit PCC can execute programs that are stored in the memory MEM. The memory MEM comprises a switch-off application program SOA in accordance with the invention.

Figure 3:
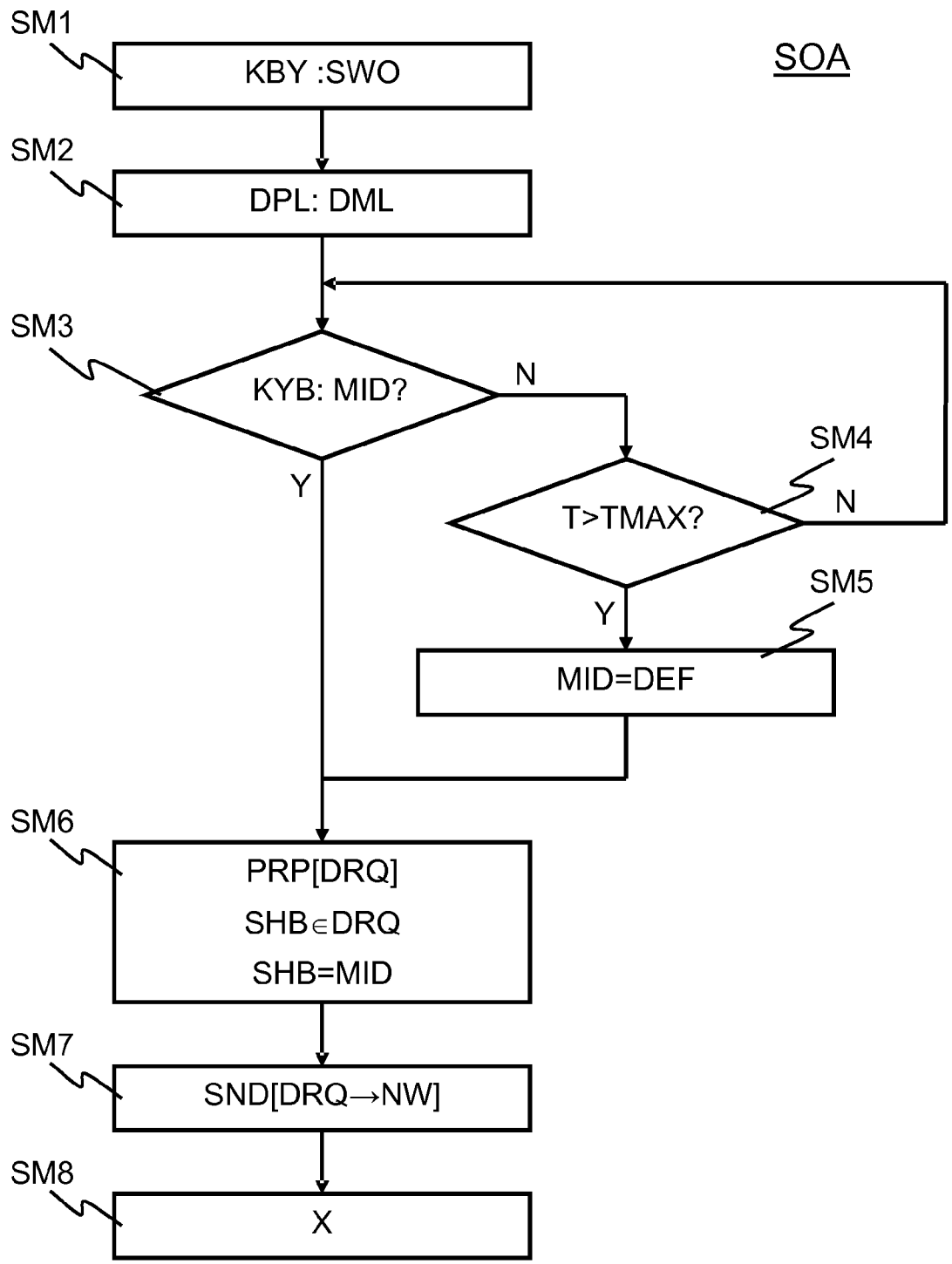
FIG. 3 is flow chart diagram that illustrates a switch off procedure, which the cellular phone may carry out.

FIG. 3 illustrates the switch-off application program SOA. The switch-off application program SOA causes the cellular phone MP1 to carry out various operations when the processing and control circuit PCC executes the switch-off application program SOA. FIG. 3 illustrates these operations in the form of a series of steps SM1-SM8.

In step SM1, the processing and control circuit PCC detects that a user requests the cellular phone MP1 to switch off because, for example, the user has depressed a switch-off button on the keyboard KYB (KBY: SWO). Such a switch-off request activates the switch-off application program SOA.

In step SM2, the processing and control circuit PCC causes the display device DPL to display a detach message list DML (DPL: DML). The detach message list DML may be stored, for example, in the subscriber identity module SIM. The detach message list DML is a menu which various items from which the user may select a particular item.

Figures 4, 5:
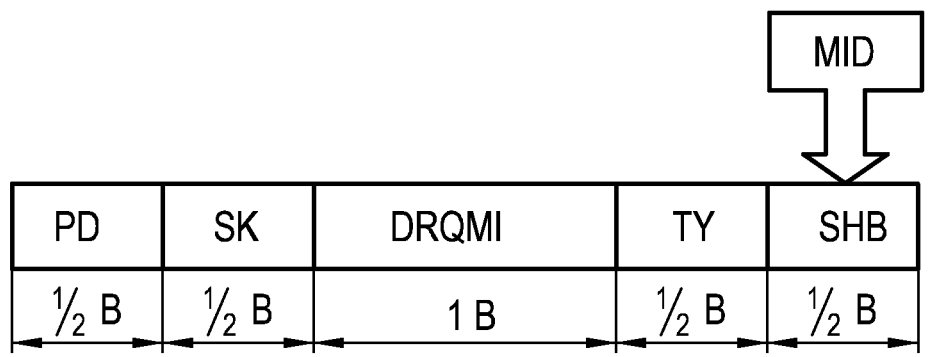
FIG. 4 is a pictorial diagram that illustrates a detach message list, which the cellular phone may display when carrying out the switch off method.
FIG. 5 is a syntactical diagram that illustrates a detach request message, which the cellular phone may convey to a network.

FIG. 4 illustrates the detach message list DML. The detach message list DML comprises 16 rows. Each row has a message identification number MID and specifies a detach message MSG, except the row whose message identification number MID is 0. Accordingly, FIG. 4 illustrates 15 detach messages AA, BB, CC, . . . , OO having message identification numbers 1-15, respectively. A detach message is a message that the user might one to leave to someone who tries to call him or her on cellular phone MP1 while cellular phone MP1 is switched off. For example, detach message AA may be the following text: "I am on my way to the office". Detach message BB may be the following text: "Will be available on my home phone".

Referring again to FIG. 3, the processing and control circuit PCC checks in step SM3 whether the user has selected a particular detach message (KYB: MID?). The user may select a particular detach message by, for example, depressing a key sequence that corresponds with the detach message identification number MID on the keyboard KYB. Let it be assumed that the user has not yet selected any detach message. In that case, the processing and control circuit PCC carries out step SM4.

In step SM4, the processing and control circuit PCC verifies whether the following condition is true or false: the detach message list DML has been displayed for an interval of time that exceeds a threshold value, which represents a timeout (T>TMAX?). The processing and control circuit PCC carries out step anew SM3 if the aforementioned condition is false (N). That is, steps SM3 and SM4 constitute a waiting loop, which provides the user a certain amount of time to select his or her detach message. The processing and control circuit PCC carries out step SM5 if the aforementioned condition is true (Y), which means that the user has not made any selection within a predefined time interval.

In step SM5, the processing and control circuit PCC selects a default detach message (MID=DEF). The default detach message may be a particular detach message from the detach message list DML, which FIG. 4 illustrates. For example, the default detach message may be KK, which corresponds to the message identification number MID being 11. As another example, the default detach message may be empty, which corresponds to the message identification number MID being 0.

In step SM6, the processing and control circuit PCC prepares a detach request message DRQ that indicates that the cellular phone MP1 is about to be switched off (PRP[DRQ]). The detach request message DRQ is in conformity with the GSM standard as laid down in the 3GPP TS 04.08 recommendations. Table 9.4.5.2 of these recommendations provides details of the detach request message DRQ. In accordance with the invention, the detach request message DRQ indicates the detach message that the user has selected or the default detach message, whichever applies.

FIG. 5 illustrates the detach request message DRQ in accordance with the invention. The detach request message DRQ comprises the following information elements: a protocol discriminator PD, a skip indicator SK, a detach request message identity DRQMI, a detach type TY, and a spare half byte SHB. Each information element has a specified length; the detach request message identity DRQMI is a full byte long; the other information elements are half a byte long. The spare half byte SHB thus comprises four bits. The value of these four bits depends on the detach message that the user has selected. That is, the spare half byte SHB indicates a particular detach message, which may be the default detach message if the user failed to select a particular detach message MSG. For example, the spare half byte SHB may be equal to the message identification number MID illustrated in FIG. 4.

In step SM7, the processing and control circuit PCC causes the transceiver circuit TRX to send the detach request message DRQ to the network NW (SND[DRQ→NW]). As mentioned hereinbefore, the spare half byte SHB within the detach request message DRQ indicates a particular detach message. The network NW has a corresponding detach message list. Accordingly, the network NW is aware of the detach message that the user of cellular phone MP1 has selected, assuming that a selection has been made.

In step SM8, the processing and control circuit PCC may carry out one or more further operations for safely switching off the cellular phone MP1 (X).

FIG. 4 illustrates that the detach message list DML may comprise different types of detach messages: predefined detach messages and user defines detach messages. Detach messages AA-GG are predefined detach messages. Detach messages HH-OO are user defined detach messages. An asterisk (*) indicates a user defined detach message.

The network operator may provide a collection of predefined detach messages, which have a generic character. For example, the aforementioned detach messages "I am on my way to the office" and "I will be available on my home phone" may be predefined messages. The user may download these detach predefined messages, which the network operator provides, from the network NW.

The predefined detach messages may be stored on the subscriber identity module SIM or in the memory MEM of cellular phone MP1. The network operator may also store a collection of predefined detach messages on the subscriber identity module SIM before delivery of the subscriber identity module SIM to the user. In that case, the collection of predefined detach messages is immediately available upon insertion of the subscriber identity module SIM into cellular phone MP1.

User defined detach messages are detach messages that the user has composed. These detach messages will generally have a specific character. For example, the text "Call me after 28th October" may be a user defined detach message. Once the user has composed his or her specific detach message, this message may be stored in the subscriber identity module SIM or the memory MEM within the cellular phone MP1.

The user may declare his or her specific detach message MSG to the network NW in numerous different fashions. For example, the user may declare a user defined detach message via the Internet. The network operator may have a web site on which the user has a private space, which is secured by means of a logon and a password. The user can manage his or her detach message list DML by means of such a Web interface. The user may also declare a user defined detach message to the network NW via a specific data service that the network NW offers. The so-called Unstructured Supplementary Services Data (USSD) within GSM networks is an example of such a specific data service. The user may also declare a user defined detach message by means of a phone call to the network operator.

Figure 6:
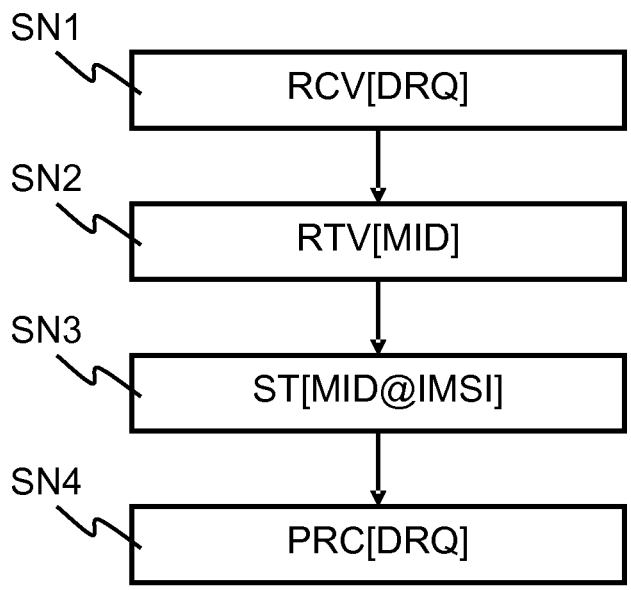
FIG. 6 is flow chart diagram that illustrates a detach request handling procedure, which the network may carry out.

FIG. 6 illustrates the detach handling application program DHA. The detach handling application program DHA causes the network NW to carry out various operations the upon receipt of a detach request message DRQ. FIG. 3 illustrates these operations in the form of a series of steps SN1-SN4.

In step SN1, the network NW receives the detach request message DRQ from cellular phone MP1 (RCV[DRQ]). The receipt of this message activates the detach request handling application program. It should be noted that the network NW uniquely identifies the subscriber identity module SIM comprised in cellular phone MP1 by means of an International Mobile Subscriber Identity (IMSI). Consequently, the IMSI uniquely identifies cellular phone MP1 assuming that the subscriber identity module SIM remains in cellular phone MP1.

In step SN2, the network NW retrieves a message identification number MID from the spare half byte SHB in the detach request message DRQ (RTV[MID]). The message identification number MID may correspond with, for example, the spare half byte SHB.

In step SN3, the network NW stores the message identification number MID in association with the IMSI that uniquely identifies cellular phone MP1 (ST[MID@IMSI]). The message identification number MID points to the detach message that the user of cellular phone MP1 has selected from the detach message list DML illustrated in FIG. 4. The detach message list DML, or an equivalent thereof, is present in the network NW. The detach message list DML is uniquely associated with the IMSI because the detach message list DML comprises user defined messages. A generic detach message list, which comprises predefined messages only, need not necessarily be uniquely associated with the IMSI.

In step SN4, the network NW further processes the detach request message DRQ so as to ensure that cellular phone MP1 has properly been disconnected from the network NW (PRC [DRQ]). The network NW stores an indication that cellular phone MP1 has been switched off.

Figure 7:
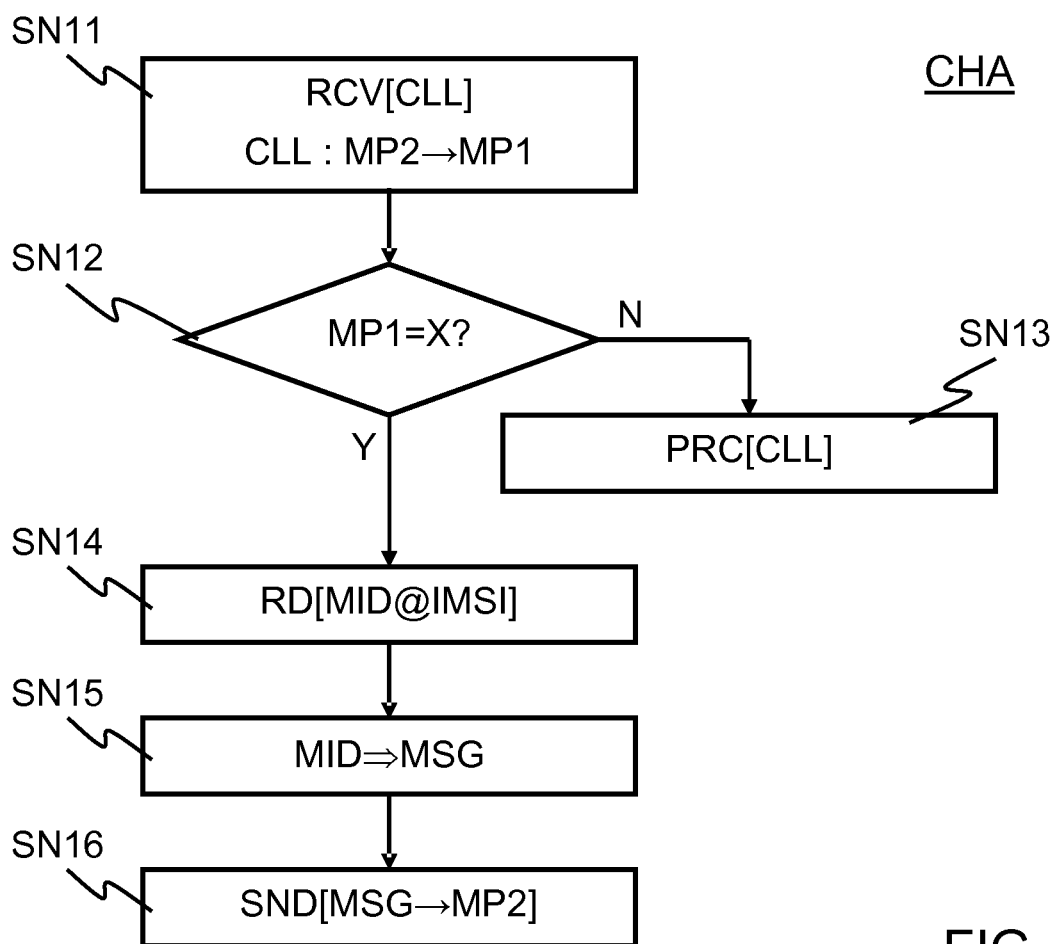
FIG. 7 is flow chart diagram that illustrates a call handling procedure, which the network may carry out.

FIG. 7 illustrates the call handling application program CHA. The call handling application program CHA causes the network NW to carry out various operations upon the receipt of a call that is destined for a particular cellular phone MP1. FIG. 3 illustrates these operations in the form of a series of steps SN11-SN16.

In step SN11, the network NW receives a call that emanates from cellular phone MP2 (RCV[CLL]). The call is destined for cellular phone MP1 (CLL: MP2→MP1).

In step SN12, the network NW verifies whether the following condition is true or false: cellular phone MP1 has been switched off (MP1=X?). The network NW carries out step SN13 if the aforementioned condition is false (N), which means that cellular phone MP1 is switched on. In that case, the network NW processes the call, which will cause cellular phone MP1 to ring or to inform its user otherwise that someone is trying to reach him or her. The network NW carries out steps SN14, SN15, SN16 if the aforementioned condition is true (Y). The network NW thus carries out steps SN14, SN15, SN16 if cellular phone MP1 has been switched off.

In step SN14, the network NW reads the message identification number MID that has been stored in association with the IMSI of cellular phone MP1 as described hereinbefore with reference to FIG. 6 (RD[MID@IMSI]).

In step SN15, the network NW establishes a message on the basis of the message identification number MID and the detach message list DML illustrated in FIG. 4, which is present in the network NW (MID⇒MSG). The message, which the network NW establishes, is the detach message that the user of cellular phone MP1 has selected from the detach message list DML just before cellular phone MP1 was switched off.

In step SN16, the network NW sends the detach message concerned to cellular phone MP2, which is a calling party (SND[MSG→MP2]). The network NW may send the detach message in the form of, for example, spoken words. In that case, the user of cellular phone MP2 hears the detach message, which may be, for example: "I am on my way to the office". Alternatively, the network NW may send the detach message in the form of a text. The network NW may inform the user of cellular phone MP2 of the arrival this text by means of a spoken word or any other kind of sensorial signal, such as, for example a bleep sound or a vibration.

CONCLUDING REMARKS

The detailed description hereinbefore with reference to the drawings illustrates the following characteristics, which are cited in various independent claims. A communication apparatus (MP1), which allows a user to communicate via a network (NW), carries out a switch off step (SOA) in response to a switch off command. In the switch off step (SOA), the communication apparatus (MP1) allows the user to select (SM2, SM3) a detach message (AA, BB, CC, . . . , OO) from a list of detach messages (DML). The communication apparatus (MP1) conveys (SM6, SM7) a detach message identification (MID) to the network (NW) and, subsequently, switches off (SM8). The detach message identification (MID) represents the detach message that the user has selected. The network (NW) carries out a call handling step (CHA) in which the network (NW) conveys the detach message to another communication apparatus (MP2) from which a call emanates that is destined for the communication apparatus (MP1) that is switched off.

The detailed description hereinbefore further illustrates various optional characteristics, which are cited in the dependent claims. These characteristics may be applied to advantage in combination with the aforementioned characteristics. Various optional characteristics are highlighted in the following paragraphs. Each paragraph corresponds with a particular dependent claim.

The communication apparatus (MP1) conveys a detach request message (DRQ) to the network (NW) in the switch off step (SOA) so as to signal the network (NW) that the communication apparatus (MP1) is about to be switched off. The detach message identification (MID) is included in the detach request message (DRQ). These characteristics allow low-cost implementations.

The detach request message (DRQ) is in conformity with a communication standard, which provides that the detach request message (DRQ) comprises a spare portion (SHB). The communication apparatus (MP1) includes the detach message identification (MID) in the spare portion (SHB) of the detach request message (DRQ). These characteristics further contribute to low cost.

An operator of the network (NW) allows the user of the communication apparatus (MP1) to include user defined detach messages (*) in the list of detach messages (DML). This characteristic contributes to more user friendliness.

The communication apparatus (MP1) establishes whether the user has selected a detach message within a predefined time interval. If not, a default value is assigned to the detach message identification (MID) that is conveyed to the network (NW). The default value represents a default detach message. This characteristic further contributes to better communication.

The aforementioned characteristics can be implemented in numerous different manners. In order to illustrate this, some alternatives are briefly indicated.

There are numerous different types of communication and communication standards in which the invention can be used to advantage. Cellular telephony, in particular GSM, is merely an example. For example, the invention can also be applied in TDMA and CDMA communication standards (TDMA is an acronym for Time Division Multiplex Access and CDMA is an acronym for Code Division Multiplex Access). Referring to FIG. 1, a landline phone may replace cellular phone MP2. A landline phone, which can be switched off or otherwise disconnected from the network NW, may replace cellular phone MP1.

The term "detach message" should be interpreted broadly. The term covers any kind of message that the communication apparatus may send to the network during a switch off procedure. The term "switch off" should be interpreted broadly. The term covers any kind action that causes the communication apparatus to be effectively disconnected from the network. A part of the communication apparatus may remain active while the communication apparatus is disconnected from the network so as to allow a user, for example, to play games.

The list of detach messages can be expressed in numerous different fashions. FIG. 4 merely illustrates an example in which the list comprises 16 different messages, one of the messages being empty. The list may be smaller and comprise, for example, 8 different messages, or the list may be longer and comprise, for example, 32 different messages. It should further be noted that a particular predefined detach message need not necessarily have a specific position within the list of detach messages. For example, the detach message "I am on my way to the office" may have the message identification number 2 in one list, which belongs to a particular user, whereas the same message has the message identification number 3 in another list, which belongs to another particular user.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function. For example, a switch-off application program may be stored in a subscriber identity module.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. A method, comprising:
responding, under control of at least one processing device of a first communication apparatus, to a switch-off command by:
prompting a user to select a detach message from a list of detach messages;
conveying a detach message identification to a network; and
after conveying the detach message identification to the network, switching off the first communication apparatus; and
subsequent to switching off the first communication apparatus, conveying, under control of the network and based on the detach message identification, a detach message to a second communication apparatus from which a call emanates that is destined for the first communication apparatus.

2. The method of claim 1, the first communication apparatus conveying a detach request message to the network so as to signal the network that the first communication apparatus is about to be switched off, the detach message identification being included in the detach request message.

3. The method of claim 2, the detach request message being in conformity with a communication standard, which provides that the detach request message comprises a spare portion, the communication apparatus including the detach message identification in the spare portion of the detach request message.

4. The method of claim 1, further comprising allowing the user of the first communication apparatus to include user defined detach messages in the list of detach messages.

5. The method of claim 1, the first communication apparatus determining, within a predefined time interval, whether the user has selected a detach message and, if the user has not selected a detach message within the predefined time interval, assigning a default value to the detach message identification that is conveyed to the network, the default value representing a default detach message.

6. A communication device, comprising:
a transceiver; and
at least one processing device coupled to the transceiver and configured to respond to a switch-off command by:
selecting a detach message from a list of detach messages;
generating control signals to cause a detach message identification corresponding to the selected detach message to be transmitted by the transceiver; and
after the detach message identification is transmitted by the transceiver, generating control signals to switch off the communication device.

7. A non-transitory computer-readable medium whose contents cause at least one processor of a communication apparatus to carry out a method in response to a switch-off command, the method comprising:
prompting a user to select a detach message from a list of detach messages;
conveying a detach message identification to a network based on the user selection; and
after the detach message identification is conveyed to the network, switching off the communication apparatus.

8. A network, comprising at least one processing device configured to implement:
a call handling module; and
a detach handling module configured to receive a detach message identification transmitted by a communication apparatus, the detach message identification representing a detach message that a user of the communication apparatus has selected in a switch off step, which ends by switching off the communication apparatus after the detach message identification is transmitted by the communication apparatus, wherein the call handling module is configured to convey the detach message to another communication apparatus from which a call emanates that is destined for the communication apparatus that is switched off.

9. A non-transitory computer-readable medium whose contents cause at least one processing device of a network to carry out:
a detach request handling step in which the network receives a detach message identification transmitted by a communication apparatus, the detach message identification representing a detach message that a user of the communication apparatus has selected in a switch off step, which ends by switching off the communication apparatus after the detach message identification is transmitted by the communication apparatus; and
a call handling step in which the network conveys the detach message to another communication apparatus from which a call emanates that is destined for the communication apparatus that is switched off.

10. The communication device of claim 6 wherein the at least one processing device is configured to select a detach message from a list of detach messages by generating signals to cause the communication device to prompt a user to select a detach message.

11. The communication device of claim 10 wherein the at least one processing device is configured to select a default message when a defined period of time elapses without a response to the prompt being received.

12. The communication device of claim 6 wherein the control signals to cause the detach message identification corresponding to the selected detach message to be transmitted cause a detach request message to be transmitted so as to signal a network that the communication device is about to be switched off, the detach message identification being included in the detach request message.

13. The communication device of claim 12 wherein the detach request message conforms with a communication standard, which provides that the detach request message comprises a spare portion and the control signals to cause the detach message identification to be transmitted cause the detach message identification to be included in the spare portion of the detach request message.

14. The non-transitory computer-readable medium of claim 7 wherein the method further comprises conveying a detach request message to the network so as to signal the network that the communication apparatus is about to be switched off, the detach message identification being included in the detach request message.

15. The non-transitory computer-readable medium of claim 14 wherein the detach request message complies with a communication standard, which provides that the detach request message comprises a spare portion, the method comprising including the detach message identification in the spare portion of the detach request message.

16. The non-transitory computer-readable medium of claim 7 wherein the method comprises determining whether the user has selected a detach message within a time interval and, if not, assigning a default value to the detach message identification that is conveyed to the network, the default value representing a default detach message.

17. The network of claim 8 wherein the detach handling module is configured to extract the detach message identification from a spare portion of a detach request message.

18. The non-transitory computer-readable medium of claim 9 wherein the detach request handling step comprises extracting the detach message identification from a spare portion of a detach request message.

* * * * *